No. 679,154. Patented July 23, 1901.
A. L. F. MITCHELL.
WEIGHING MACHINE.
(Application filed Oct. 20, 1900.)
(No Model.) 5 Sheets—Sheet 1.
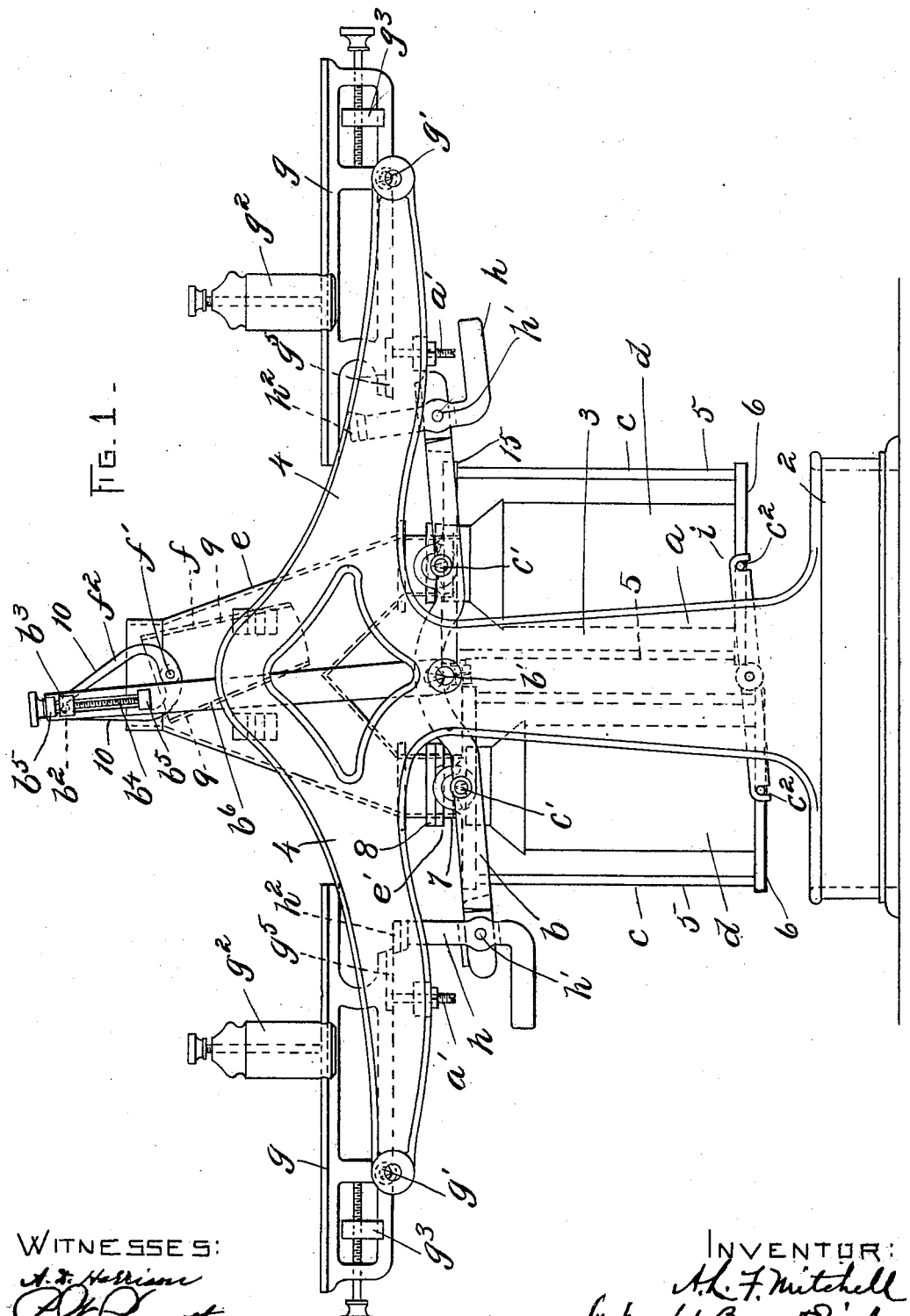
WITNESSES:
INVENTOR:

No. 679,154. Patented July 23, 1901.
A. L. F. MITCHELL.
WEIGHING MACHINE.
(Application filed Oct. 20, 1900.)
(No Model.) 5 Sheets—Sheet 2.
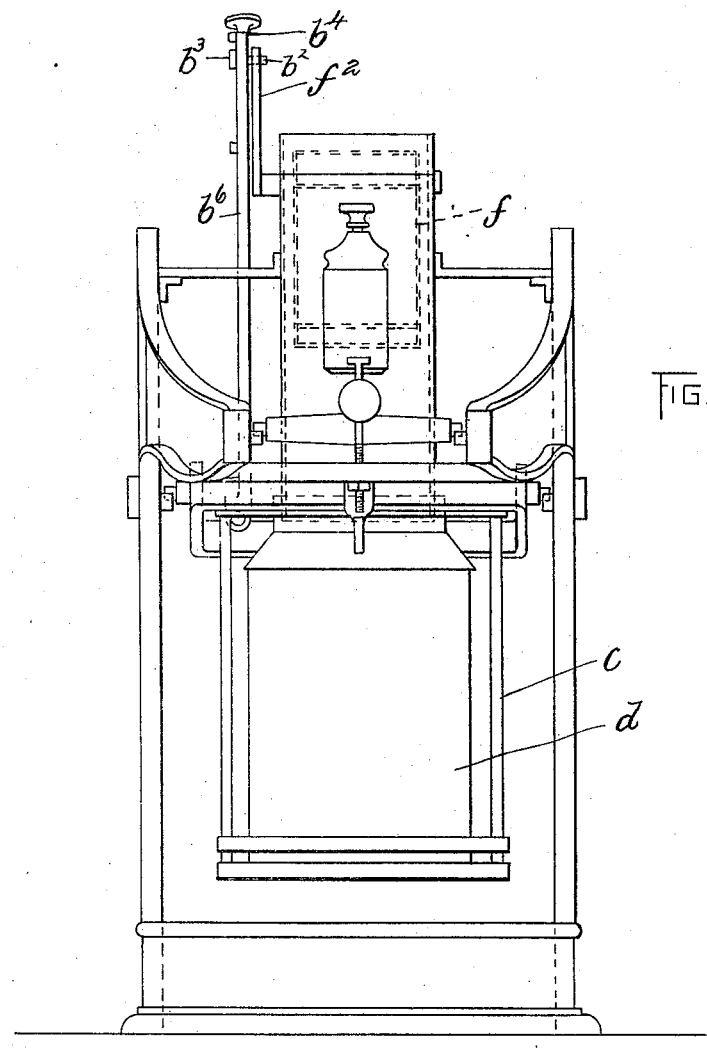
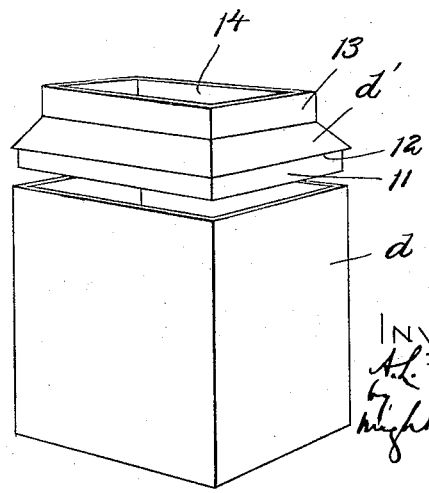
WITNESSES:
INVENTOR:

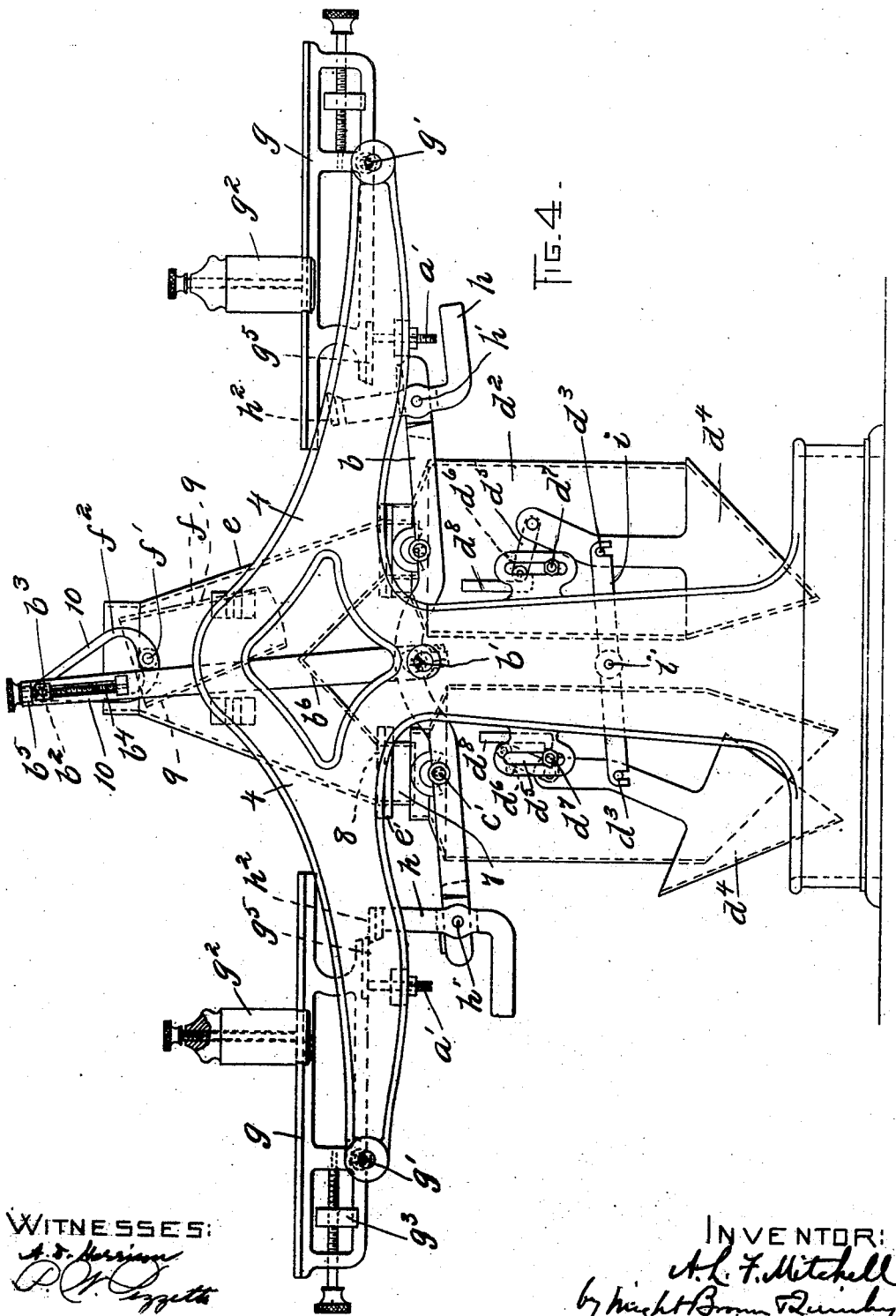

No. 679,154. Patented July 23, 1901.
A. L. F. MITCHELL.
WEIGHING MACHINE.
(Application filed Oct. 20, 1900.)
(No Model.) 5 Sheets—Sheet 4.
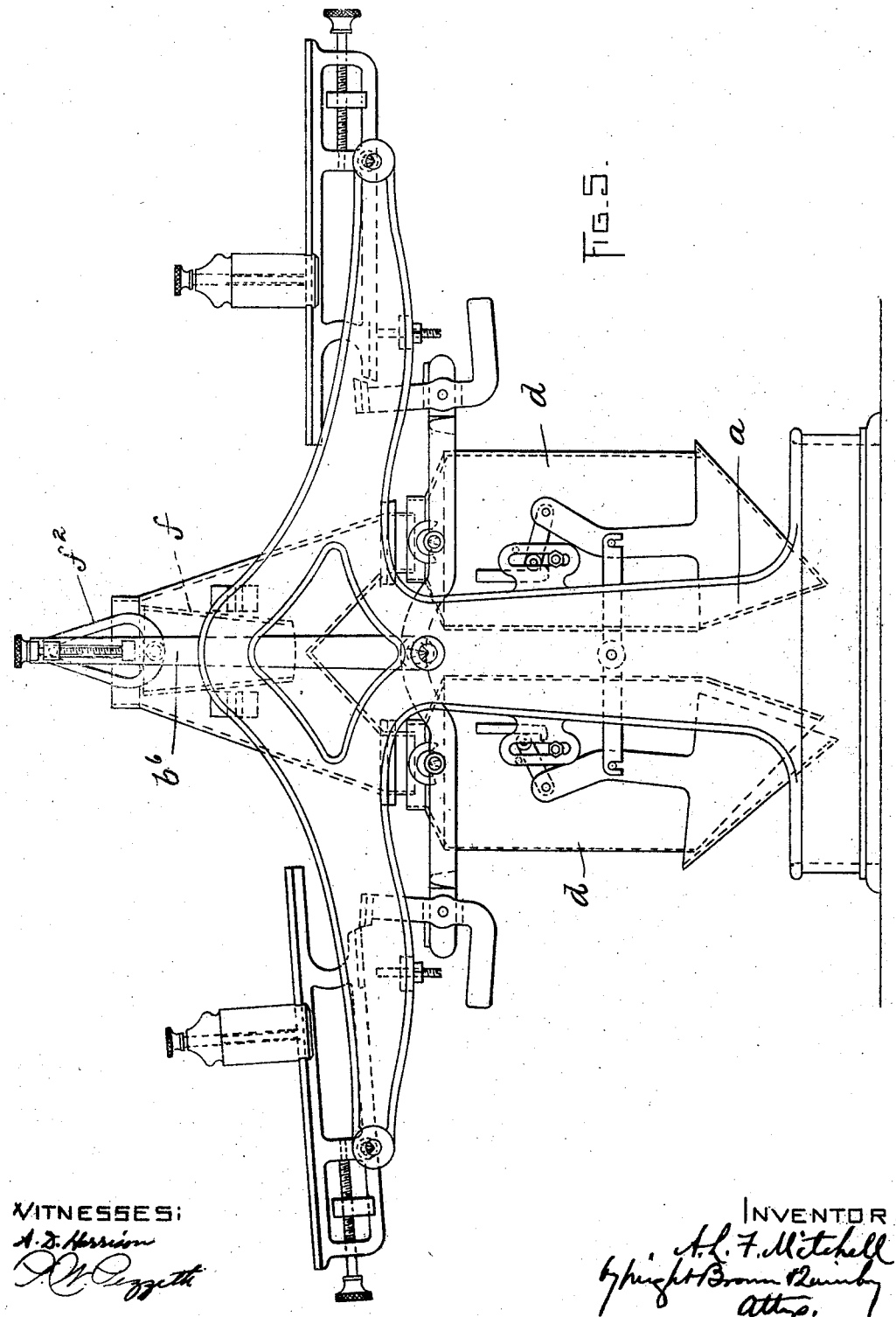
WITNESSES:
INVENTOR:

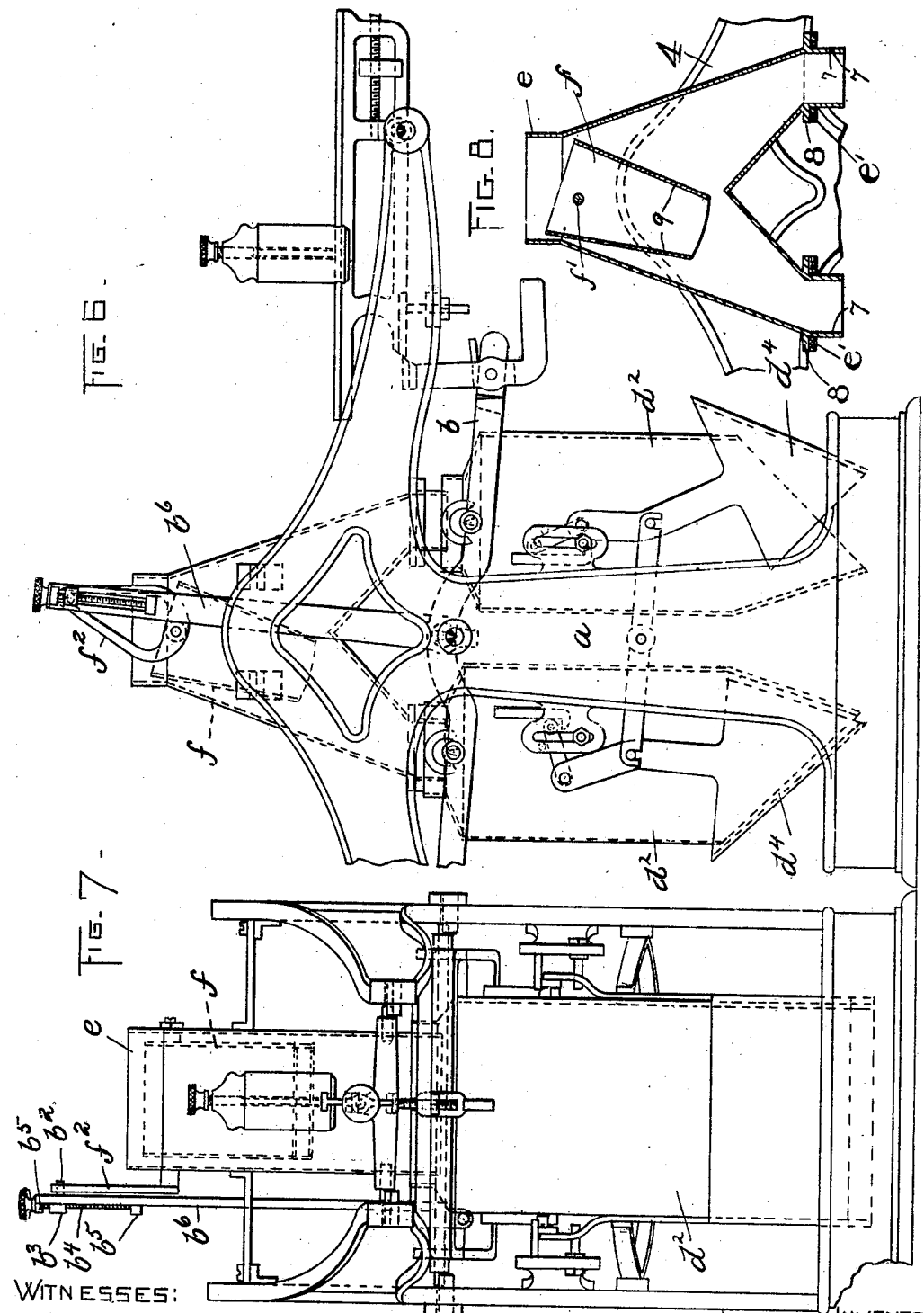

UNITED STATES PATENT OFFICE.

ALBION L. F. MITCHELL, OF EAST BOSTON, MASSACHUSETTS, ASSIGNOR OF ONE-HALF TO CHARLES W. AIKEN, OF EAST ORANGE, NEW JERSEY.

WEIGHING-MACHINE.

SPECIFICATION forming part of Letters Patent No. 679,154, dated July 23, 1901.

Application filed October 20, 1900. Serial No. 33,674. (No model.)

*To all whom it may concern:*

Be it known that I, ALBION L. F. MITCHELL, of East Boston, in the county of Suffolk and State of Massachusetts, have invented certain new and useful Improvements in Weighing-Machines, of which the following is a specification.

This invention relates to weighing-machines of the kind employing two weighing-buckets and means for deflecting a stream of the material to be weighed first into one bucket and then into the other, whereby the buckets are filled alternately.

The invention has for one object to provide an improved deflector mechanism giving greater accuracy and delicacy in the weighing than has heretofore been attained.

Another object of the invention is to provide an improved bucket construction employing removable buckets.

The invention consists in the improvements which I shall now proceed to describe and claim.

Of the accompanying drawings, Figure 1 represents a side elevation of a weighing-machine constructed in accordance with my invention. Fig. 2 represents an end elevation thereof. Fig. 3 represents a detail perspective view of the improved weighing-bucket and its cover. Figs. 4, 5, and 6 represent side elevations of another form of weighing-machine embodying my invention, the last said figure showing the machine partly broken away, and the said figures illustrating the parts of the machine in different operative positions. Fig. 7 represents an end elevation of the latter form of machine. Fig. 8 represents a vertical sectional view of the feed-chute and deflector.

The same reference characters indicate the same parts in all the figures.

Referring to the drawings, $a$ designates the frame of the machine, having a base portion 2, side standards 3 3, rising from said base, and laterally-extending arms 4 4 for supporting the weighted levers, hereinafter referred to. In the middle of the frame $a$ at $b'$ is pivoted a beam $b$, which pivotally supports two weighing-buckets, one on each side of its pivot, said buckets being represented in Figs. 1, 2, and 3 by the reference-letter $d$ and in Figs. 4 to 7 by the letter $d^2$.

$e$ is a bifurcated feed-chute having two delivery-orifices at its lower end, located above the two weighing-buckets, said orifices each having a vertical flange 7, which extends into the mouth of the weighing-bucket, and a horizontal flange 8, faced by a packing $e'$, of felt or similar material, on its lower side, which serves to prevent the escape of dust and also acts as a buffer or abutment which limits the upward movement of the bucket when said bucket rises into weighing position.

Pivoted at $f'$ in the upper portion of the feed-chute $e$ is a deflector or valve $f$, made in the form of a chute having deflecting sides 9 9, between which the stream of material to be weighed flows into one or the other of the legs of the feed-chute. Attached to the pintle of said chute is an arm $f^2$, approximately triangular in shape and having the inclined side bars 10 10, which meet at their upper ends.

$b^6$ is an arm attached to the middle of the beam $b$ and carrying at its upper end a pin $b^2$, which operates in the space between the bars 10 10 of the arm $f^2$ and is adapted to engage the inner edges of said bars, as will be explained. Said pin $b^2$ is mounted upon a block $b^3$, guided in a slot in the arm $b^6$, and is engaged by a screw $b^4$, journaled in lugs $b^5$ $b^5$ on the arm $b^6$, by which mechanism the pin $b^2$ may be adjusted vertically on said arm.

Supported on pivots $g'$ $g'$ at the ends of the laterally-extending arms 4 4 of the frame $a$ are weighted arms or levers $g$ $g$, having adjustable weights $g^2$ $g^2$ and counterweights $g^3$ $g^3$ and each having near its inner end a hardened metal catch-plate $g^5$, beveled at its end. Adjustable stop-screws $a'$ $a'$ normally support the weighted levers $g$ $g$. On the ends of the beam $b$ are mounted trip-catches $h$ $h$, having at their upper ends hardened metal plates $h^2$, which are beveled on their ends and are adapted to coact with the hardened plates $g^5$ on the weighted levers.

As seen in Fig. 1, the weighing-bucket on the left-hand side of the machine is depressed, bringing the catch $h$ on that side into engagement with its corresponding weighted lever $g$, while the bucket on the other side is elevated in weighing position, and the deflector $f$ is so positioned as to direct the stream of material into the right-hand leg of the feed-chute. When the right-hand bucket has received a quantity of material determined by the position which the weight $g^2$ on the weighted lever at the left occupies on said lever, said bucket will descend, lifting the inner end of said weighted lever a slight distance until the catch-plate $h^2$ passes the catch-plate $g^5$, whereupon the weighted lever will resume its normal position, and the beam $b$ will assume a position the reverse of that which it occupied, elevating the left-hand bucket into a weighing position, depressing the right-hand bucket, which has been filled, and moving the deflector $f$ so as to direct the stream of material into the left-hand bucket. At the same time the catch $h$ on the right-hand end of the weighing-beam will be displaced and come into engagement with the weighted lever $g$ on that side. The weighing operation described is then repeated with the left-hand bucket.

Heretofore in weighing-machines of this character it has been found that when a heavy stream of material is used the weighing-bucket will receive a slightly heavier charge than when a light stream is used, this being due to the fact that with a heavy stream there is more material to be exhausted from that portion of the feed-chute which is below the valve after the valve deflects the material to shut off the supply from the bucket than there is with a light stream. To correct this has required the shifting of the weights for heavy and light streams and has prevented the attainment of very accurate and delicate results. The improved deflector $f$ and its related mechanism which I have described overcomes the difficulty alluded to and automatically accommodates itself to heavy and light streams of material, for supposing the deflector to be in the position represented in Fig. 4 and the stream of material to be flowing therethrough said material impinges against the left-hand side or deflecting portion 9 of the deflector, and the pressure of the material, by reason of the fact that the said deflecting portion 9 occupies an inclined position, tends to bring the deflector into a vertical position such as represented in Fig. 5. This deflecting force of the stream of material is greater for heavy streams and less for light streams, as is evident, and said force is resisted through the hereinbefore-described connection of the deflector with the scale-beam $b$ by the weighted lever $g$ engaging said scale-beam. The deflector therefore assists the scale-beam in tilting when the bucket has received its proper quantity of material, and as the assistance will be greater with heavier streams than with lighter streams the liability of error previously alluded to is overcome. When the deflector is filling the right-hand leg of the chute, the left-hand bar 10 of the arm $f^2$ presses against the pin $b^2$ and vice versa.

The buckets shown in Figs. 4 to 7 are permanent parts of the machine and are provided on their lower ends with closers $d^4$ $d^4$, having upwardly-extending arms pivoted to studs $d^3$ $d^3$ on the buckets, said arms being extended beyond the studs and having at their upper ends catches $d^5$ $d^5$, which coöperate with locking-plates $d^8$ $d^8$, fixed to the buckets, and pins $d^6$ $d^7$, fixed to the frame $a$, in locking the closers in closed position when the buckets are up and unlocking them to permit the discharge of the load when the buckets are down. Figs. 4 and 6 represent the beam and parts connected therewith in their two extremes of position, and Fig. 5 represents the same in an intermediate position.

Figs. 1 to 3 represent an improved arrangement for filling cans or similar packages with material, which cans may be removed from the machine and provided with covers and shipped or sold as commercial packages. The arrangement involves the use of cages $c$ $c$, pivoted at $c'$ $c'$ to the beam $b$, and consisting of top cross bars or frames 4, vertical side rods 5 5, and bottom portions or scale-pans 6 6 for supporting the buckets $d$. The latter, as stated, are in the form of cans, preferably flat bottomed, so as to rest on the scale-pans, and fitted when positioned in the machine with tops of an inverted-hopper shape, which surround the delivery-orifices 7 of the feed-chute $e$. Said tops each have a downwardly-projecting flange portion 11, adapted to fit into the upper end of the can or body $d$, a projecting flange 12, resting on the rim of the can, and a top flange 13, surrounding a contracted opening 14, which admits the delivery end of the feed-chute. In operating this embodiment of the invention two cans $d$ are slid onto the scale-pans, and fitted with the tops $d'$, the feed is started, and as soon as a can fills and descends it is removed and a fresh can substituted and fitted with the top $d'$, the operation being repeated with the other can when it has filled. This form of the weighing-machine is particularly useful in weighing materials of a powdery nature, such as cocoa, the particles of which pack together and are apt to cling to the sides of the bucket.

The machine in Figs. 4 to 7 is provided with a lever $i$ for steadying or guiding the buckets, said lever being pivoted at $i'$ to the frame $a$ and engaged at its ends with the pins $d^3$ on the buckets. A similar lever is provided on the machine of Figs. 1 and 2, its ends being engaged with pins $c^2$ $c^2$ on the edges of the scale-pans 6 6.

I claim—

1. In a weighing-machine, a weighing mechanism including a scale-pan, in combination with a removable bucket supported thereby and provided with a removable inverted hopper-shaped top, and a feed-chute adapted to supply material to said bucket through said top.

2. In a weighing-machine, a feed-chute, a pivoted double deflector therein, an arm connected to said deflector and having two angularly-related bars, a scale-beam having an arm, and a pin on the last said arm adapted to engage either of said bars.

3. In a weighing-machine, a scale-beam, a feed-chute, a deflector therein having a beam-oscillating connection with the beam, and adjustable means to vary the leverage exerted by said deflector on said beam.

4. In a weighing-machine, a scale-beam having an arm, a feed-chute, a deflector having an arm extended in a general direction longitudinally of said scale-beam arm, a pin forming a connection between said arms, and means to adjust said pin longitudinally of said arms and thus vary the leverage exerted by the deflector-arm on the scale-beam arm.

5. In a weighing-machine, a scale-beam having an arm, a feed-chute, a deflector having an arm extended in a general direction longitudinally of said scale-beam arm, a pin mounted on the scale-beam arm and adjustable in guides longitudinally thereof, said pin engaging the deflector-arm, and an adjusting-screw for varying the longitudinal position of the pin.

In testimony whereof I have affixed my signature in presence of two witnesses.

ALBION L. F. MITCHELL.

Witnesses:
C. F. BROWN,
A. D. HARRISON.